United States Patent [19]

Larsson

[11] Patent Number: 4,558,830

[45] Date of Patent: Dec. 17, 1985

[54] HANDLING UNIT FOR REELABLE CORD-LIKE GOODS AND ITS USE IN AN INTEGRATED HANDLING SYSTEM

[76] Inventor: Stig A. Larsson, Lomvägen 253, S-191 56 Sollentuna, Sweden

[21] Appl. No.: 413,361

[22] PCT Filed: Dec. 16, 1981

[86] PCT No.: PCT/SE81/00377

§ 371 Date: Aug. 18, 1982

§ 102(e) Date: Aug. 18, 1982

[87] PCT Pub. No.: WO82/02187

PCT Pub. Date: Jul. 8, 1982

[30] Foreign Application Priority Data

Dec. 19, 1980 [SE] Sweden ............................... 8009008

[51] Int. Cl.[4] ...................... B65H 67/06; B65G 37/00; G05B 15/00

[52] U.S. Cl. .................................... 242/54 R; 242/79; 414/911

[58] Field of Search .................... 242/54 R, 58.6, 68.4, 242/79, 85, 129.5; 414/908, 910, 911; 198/473, 680; 105/148, 150–155; 104/89, 94–96, 98, 102, 130, 131

[56] References Cited

U.S. PATENT DOCUMENTS

| | | | |
|---|---|---|---|
| 2,801,057 | 7/1957 | Rayburn | 242/79 X |
| 2,991,023 | 7/1961 | O'Brien | 242/79 |
| 3,056,360 | 10/1962 | Burmeister et al. | 104/96 |
| 3,186,655 | 6/1965 | Huffington et al. | 242/79 |
| 3,358,611 | 12/1967 | Westfall et al. | 104/120 |
| 3,424,394 | 1/1969 | Moore | 242/58.6 |
| 3,822,044 | 7/1974 | Reikkinen | 242/79 |
| 4,144,961 | 3/1979 | Kasahara et al. | 198/472 |
| 4,165,052 | 8/1979 | Seibert | 242/79 X |
| 4,209,140 | 6/1980 | Seibert | 242/79 |

FOREIGN PATENT DOCUMENTS

| | | |
|---|---|---|
| 2752817 | 3/1979 | Fed. Rep. of Germany . |
| 337054 | 7/1971 | Sweden . |
| 79015525 | 2/1978 | Sweden . |
| 407388 | 3/1979 | Sweden . |
| 414755 | 8/1980 | Sweden . |
| 1214641 | 12/1970 | United Kingdom . |
| 1269717 | 4/1972 | United Kingdom . |
| 2041029 | 9/1980 | United Kingdom . |

*Primary Examiner*—Stuart S. Levy
*Assistant Examiner*—David Werner
*Attorney, Agent, or Firm*—Burns, Doane, Swecker & Mathis

[57] ABSTRACT

A handling unit (1) is movable along a transport path (10) and comprises a rotatable reel (5) for coiling/uncoiling of cord-like goods. The reel comprises an axle (8) provided with a coupling element in at least one end, said element being connected to a driving device (50) in a coiling station or to a braking device (40) in an uncoiling station. The transport path (10) connects a plurality of coiling/uncoiling stations with a buffer storage (220) for handling units in an integrated handling system comprising one or several production lines (201,202) for cord-like goods, preferably for communication cable or power cable.

The transport path includes turntables (121), carriages for parallel movement (101), bypassing units (217) and lifts (131) to provide passages for the units (1) from one part of the path (10) to other parts (110,120,130).

A control unit (384) attached to a host computer (380) controls the movement of handling units on the transport path and the engagement and disengagement of units to and from driving and braking devices in the stations.

21 Claims, 13 Drawing Figures

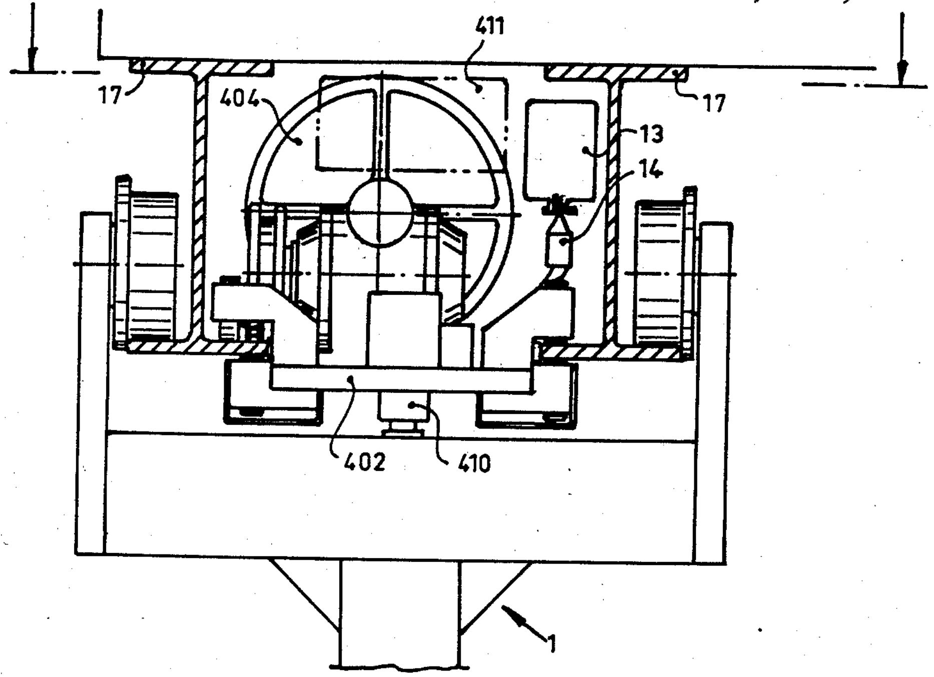
FIG. 13
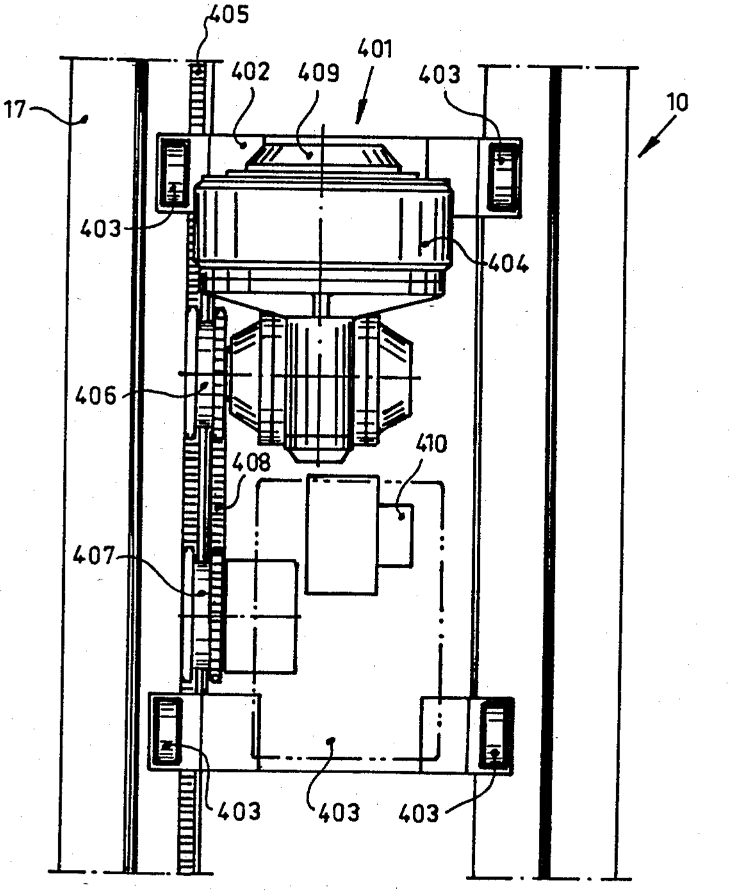

HANDLING UNIT FOR REELABLE CORD-LIKE GOODS AND ITS USE IN AN INTEGRATED HANDLING SYSTEM

BACKGROUND AND OBJECTS OF THE INVENTION

The present invention relates to a handling unit for reelable cord-like goods, such as wire steel, or electric cables etc and more specifically to an integrated handling system for such goods in production lines.

According to Swedish Pat. No. 337 054 it is known to automatically reel cable or wire on a drum or reel. In order to improve the reeling or winding process the reel can be moved in the direction of its axis so that the cable can be wound evenly on the reel.

One disadvantage with such an arrangement is that when the reel has been filled, it has to be lowered down onto the floor, released and moved substantially manually to a new working position for further processing. Such full reels which may have a weight of several tons, are very difficult to handle and moving a reel by rolling it is both time-consuming and dangerous.

According to the published Swedish patent application No. 7901552-5 these disadvantages can be reduced by moving a reel in its axial direction along guide means from one working position to another. Furthermore, the entire stand carrying the reel can be moved forwards and backwards along rails or in the floor. This substantially reduces the number of reel loading and unloading operations and hence the necessary manual handling operations.

However, in spite of these improvements the reels must still be manually handled to a considerable extent on the floor, especially if the plant is large and includes a great number of mutually remote work stations. There is also still a need of big and heavy stand structures to carry the reels which increases the need of space and reduces the free areas required for manually handling the reels.

A further disadvantage with such known arrangements is the great risk of a loaded or unloaded reel falling from its stand, resulting in damage to it or injury to persons handling it. This can happen, inter alia, due to wear or faulty assembly of the locking device of a dismountable reel.

Another drawback with dismountable reel structures is the difficulty of achieving even and smooth rotation of the reel. If, for instance, a removable shaft or trunnions are used to keep the reel in its working position some play is needed between the shaft and the reel hub to enable mounting the reel in its working position. This play often causes erraticness in reel rotation.

It is also known to use fork trucks or the like for moving reels from one work station to another, but this is also complicated as well as space and time consuming.

Still another problem in the art of prior handling systems for cable reels is the difficulty of obtaining the precision required for fitting a reel into its proper working position at a work station, when it is rolled along the floor or conveyed by a truck.

The present invention, as defined in the appended claims, has the object of providing a solution to these problems.

SUMMARY OF THE INVENTION

In accordance with the present invention a handling unit includes a rotatable barrel carried in a yoke suspended on a rail in a conveyor rail system, said barrel being used for automatically coiling or uncoiling cord-like material at a work station. The conveyor rail system connects a plurality of work stations with a buffer store of conveying units.

By means of the invention all manual handling of said material may be eliminated, thus reducing the risk of personal injury or material damage to a minimum. The exchange of handling units at a coiling/uncoiling station where only one driving source is used will occur at least as fast as in prior art systems where often two alternately operating driving sources are used to maintain a continuous operation of a production line. When only one driving source per work station is used in accordance with the invention, the distance between two work stations at either end of a production line will always be constant, which is advantageous in controlling the process.

The proposed system is economic with energy since there is no need of lifting or lowering reels, neither is there any need of mobile conveying appliances such as fork trucks or overhead travelling cranes etc. All the cord-like material in production is conveyed by means of the handling units along the shortest path between the different work stations.

The need of specially treating flooring for obtaining evenness, appropriate surface strength and structural strength is eliminated with the aid of the present invention since there is no need of moving or storing reels on the floor.

In its construction the inventive system affords economy in space since consideration does not need to be taken in respect of manoevering space, conveying aisles or safety distances required for the conventional aids otherwise used in manufacture of this kind. The required floor area for production is further reduced by moving the storage and conveying means for the inventive handling units to an upper or a lower level, automatic lifts being used to convey said units between storage and production levels. In today's plants about 30–50% of the production area is needed for storing of reels and conveying them to and from storage.

According to the inventive system, the location of handling units for work in progress is no longer restricted to short distances between the different stations. The locations may be selected according to environmental suitability, process association, availability of suitable premises and/or storage level etc. The same work station may further be used for several work operations, a higher degree of plant utilization thus being attained since the handling of units is no longer a problem.

The system enables production in several shifts with operators only during day shifts, since a large number of handling units can be stored to cover the need for non-day shift production where no attendance is required. The handling units are automatically ordered to an from the working stations.

The salient advantages with the invention are as follows:

The handling system for the reelable cord-like material in a production line can be automated.

Manual rolling of heavy reels on the floor is avoided.

Floor space is saved in the plant.

The speed of availability of a reel at a work station increases.

The risk of accidents is minimized.

The fitting in of a rotatable barrel in a work station is facilitated.

Control and regulation of material flow is improved.

The distance between two interacting work stations can always be constant.

Smooth coiling or uncoiling of the material is achieved.

Multishift operation of the plant is enabled with operators in attendance only during the daytime.

THE DRAWINGS

The invention will now be described with reference to the attached drawings illustrating different embodiments of the invention, in which FIG. 1 is a handling unit with built-in reel in accordance with the invention, FIG. 2 is a handling unit with removable reel with a drum, FIG. 3 is an uncoiling station, FIG. 4 is a coiling station, FIG. 5 is a coupling device for engaging a unit to a coiling or braking device at a work station, FIG. 6 is a means for moving a unit transverse the main material flow, FIG. 7 is a turntable for rotating the handling unit horizontally, FIG. 8 is a handling unit lift, FIG. 9 is an inventive plant layout having two production lines, FIG. 10 is a plant having a plurality of production lines, FIG. 11 is a block diagram of a control system for a plant according to the invention, FIG. 12 is another embodiment of a control system for a plant according to the invention, FIG. 13 is a handler of a handling unit according to another embodiment of the invention.

DESCRIPTION OF PREFERRED EMBODIMENTS OF THE INVENTION

The handling unit 1 illustrated in FIG. 1 is used for coiling, uncoiling or storing cables or the like, and comprises a U-shaped yoke 2 carrying between its legs 3 and 4 a reel 5 comprising two end walls 6 and a barrel 7. The reel 5 is rotatably mounted in the yoke 2 by means of a shaft 8 and two bearings 9. In order to prevent unnecessary rotation of the reel 5 it is secured by a catch (not shown) which can be released when the unit is in a working position. The upper part of the yoke 2 is provided with four wheels 11 for moving the unit 1 along a rail system 10. The wheels 11 are mounted on the yoke 2 such as to enable the handling unit to be conveyed in a rail system with curves. A motor 12 is used as a driving source for the unit 1, the motor being coupled to at least one of the wheels 11. The motor is powered from a live rail 13 via a current collector 14. A drivable coupling member 15 is provided at each end of the shaft 8.

The handling unit in FIG. 1 operates as follows. A control system which will be described later starts the motor 12 via the power rail 13 and the current collector 14 so that the unit moves along the rail system 10. The wheels 11 then roll on the rails 16 supported by support bars 17. When the unit reaches a working position in a work station current to the motor 12 is interrupted, thus stopping the unit 1. A driving means (not shown) is then applied to the coupling member 15. The unit is now ready in its working position for coiling material such as cable up on the barrel 7 when the driving means is caused to rotate the reel 5.

When the material has been coiled up on the barrel to a desired extent, the driving means is stopped and disengaged, a catch (not shown) is engaged with the reel to prevent its rotation, and the material on the reel is severed from that being produced, whereafter the motor 12 of the unit 1 is started for moving the unit to another work station or to storage.

It should be noted that the reel 5 in FIG. 1 has been shown as a barrel with two end wall discs 6, although this form is not essential according to the invention, since the reel in the unit 1 is suspended from the rail system the whole time, and there is no need to roll the reel along the floor. It is only necessary for the reel to be constructed such that easy coiling/uncoiling of the material on it is obtained.

FIG. 2 illustrates a unit 21 for utilization in a similar manner as the unit 1, but, as distinguished from unit 1, it is adapted for a removable reel 25. The unit 21 comprises a U-shaped supporting yoke 22 carrying a reel 25 between its legs 23 and 24. The reel is mounted on trunnions 26 and 27 which are carried by the legs 24 and 23, respectively. The reel is rotated with the aid of a driving means (not shown) applied to the coupling 15 which in turn is unrotatably connected to a driving dog 28 provided with means for engaging the end wall 6 of the reel 25. In this case the yoke 22 has its upper part formed such that the legs 24, 23 can be sufficiently axially diplaceable for accommodating and releasing a reel 25 and allowing it to pass between the trunnions 26, 27. The displacement is guided by a shaft 29 secured to the leg 23 and sliding in the upper part of the yoke.

The unit 21 in FIG. 2 includes a driving motor 12 and wheels 11 for travel in a rail system similar to the one for unit 1 in FIG. 1. This unit 21 is used as an input unit in the conveying system for receiving reels of material for processing and as an output unit from which reels of processed material can be removed from the production line.

A reel 25 is loaded onto the yoke 22 by means of a lifting table 32 and is fixed into the yoke 22 with the aid of an operating means 31 acting on a screw 30 to displace the yoke upper part. Thereafter the unit 21 operates as an ordinary handling unit 1. In this case the reel 25 should have disk-shaped end walls 6 for rolling on the floor.

FIG. 3 illustrates an uncoiling station for material such as cable. The unit 1 is driven by its motor into its working position in the rail system 10 and is there coupled to a braking device 40. When the device 40 is engaged, the reel catch is released and rotation will now be braked by the device 40. The device 40 includes an arm 41 pivotally mounted at one end and at its other end provided with a braking member 42 which, on engaging the unit 1, keeps it steady and prevents any pendulum movements or vibrations. The arm 41 can be lifted by means of a piston 43 driven by a motor 44, to allow a handling unit to pass the station. The arm 41 is movable at right angles to its pivoting direction with the aid of another motor 45 for engaging or disengaging the braking element 42.

FIG. 4 illustrates a coiling station for material such as cables. The unit 1 is driven by its motor 12, FIG. 1, into its working position on the rail system 10 and is there coupled to a driving means 50 (described in detail hereinbelow). In conjunction therewith the reel catch is released (rotation will now be prevented by the means 50), making the unit ready for operation.

In order to coil the material smoothly and uniformly on the reel, without lateral stresses therein, the reel is moved axially during coiling, such that for one revolution of the reel it is axially displaced the width of the material. This so-called "traversing" is, of course, a reciprocating movement with a stroke equal to the number of turns in one layer on the drum times the width of the material less one such width. The speed of the traversing movement is directly dependent on the width and rate of feed of the material. The motor 12 of the handling unit is preferably used as a driving source. Guide rolls 58 for the material are provided in front of the unit and these rolls are adjustable in relation to the diameter of the end walls 6. The guide rolls can be mounted on the floor or suspended from the rail system 10.

The means 50 includes a pivotably mounted arm 51 which, on engaging the unit, keeps it steady and prevents any pendulum movement or vibrations. The arm 51 can be lifted by means of a motor (not shown) to allow a handling unit to pass the station.

The arm 51 is movable at right angles to its pivoting direction, i.e. in the axial direction of the reel, by means of a motor 52 for engaging and disengaging a coupling part 55 of the arm with and from the reel 5. The motor 52 displaces the arm 51 with the aid of a driving chain 53 assembled around two end rollers 54. The coupling part 55 preferably includes a latch means, not shown, latching the coupling part 55 and the arm 51 to the coupling member 15 of the handling unit so that the arm 51 will accompany the traverse of the unit. The latching means is adapted for releasing the member 15 when the motor 52 rakes the arm 51 and its coupling part 55 out of engagement with the member 15.

A driving motor 56 in the means 50 is used to provide driving power via a transmission device 57 to the reel 5 for rotating it during the coiling operation.

It is obvious for one skilled in the art that the braking capacity of the braking device 40 in FIG. 3, at an uncoiling station at the end of a production line, should be adjusted for smooth and shock-free operation both for the reel at the uncoiling station and for the coiling reel at the other end of the production line.

FIG. 5 illustrates in more detail an embodiment of a coupling device for engaging a handling unit at a work station, preferably a coiling station. The left part of the coupling device corresponds to the coupling member 15 in FIG. 1 and the right part corresponds to the coupling part 55 in FIG. 4. Alternatively, the right part can correspond to the braking member 42 in an uncoiling station according to FIG. 3.

The left part, corresponding to coupling member 15 includes an end portion 77 of the shaft 8 in FIG. 1. The end portion 77 is journalled in a bearing 78 in a bearing housing 72 attached to the leg 3 or 4 in FIG. 1. The end portion 77 is further formed as the inner or male half 70 of a toothed coupling and is surrounded by the outer part 71 of the bearing housing.

The coupling part 55 comprises a rotatable splined shaft 88 which is movable into a jacket 95. The splined shaft 88 and jacket 95 are surrounded by a non-rotatable intermediate tube 92, which is displaceable in a fixed support tube 93. The splined shaft is also journalled in a bearing 94 in a non-rotating outer sleeve-like portion 85. The left end of the shaft 88 is further formed into the outer or female half 87 of the toothed coupling and is arranged to be moved into or out of engagement with the inner or male half 70 by means of a piston 89, moving in a cylinder 91, the outer end of said piston being attached to a lug 90 in the outer sleeve 85 to provide movement for engagement or disengagement of said halves 70, 87 of the toothed coupling.

When the driving, axially movable outer half 87 is moved into engagement with the inner half 70, a front end portion 86 of the outer sleeve 85 will simultaneously press back a locking ring 75, unrotatably mounted in the bearing housing part 71 and provided with the same toothing as the half 87, thereby releasing the shaft 77 for rotation. When the outer half 87, by means of piston 89, is pulled out of engagement, the locking ring 75 will move forward again under the action of a plurality of springs 73 around guiding pins 74. This will lock the axle 77, preventing the reel 15 from rotating freely when the driving device 50 or the braking device 40 is disengaged.

The piston 89 is preferably driven by a motor or any other controllable driving means.

Alternatively, the motor 45 in FIG. 3 or the motor 52 in FIG. 4 can be used as the sole means of axially displacing the outer sleeve 85 so that the outer sleeve 85 rigidly accompanies the arm 41 or the arm 51, the shaft 88 thus being no longer movable in the jacket 95. The piston 89, jacket 91 and the lug 90 are then not used.

FIG. 6 illustrates a carriage 101 for moving a handling unit 1 from one rail system 10 to a parallel rail system 110, this movement being at right angles to said rail systems. The carriage 101 is constructed with the same rail profile as the rail systems 10 and 110 and enables the unit 1 to pass straight through or into the parallel rail system 110. When the unit 1 has entered the carriage 101 and has been locked against unwanted movement, a motor 102 drives, via a gear 103 and a shaft 104, the wheels 105 running on a rail profile 106, thus moving the carriage 101 to the rail system 110. When the carriage 101 has been located, the unit 1 can then pass into the rear parallel rail system 110. The simplest way to form the lower part of the carriage is to cut the rail system 10 at two planes 107 and 108 below the carriage 101, the part 109 of the rail 10 being fastened to the carriage 101, to move in the direction of the arrow 111 when parallel transfer occurs.

FIG. 7 illustrates a turntable 121 having the same rail profile as the rail system 10 and which is arranged so that a unit can pass through it and along the rail system 10 or be diverted into another rail system 120. The turntable 121 also enables changing the conveying direction or the coiling/uncoiling direction of the material. When the unit 1 has entered the turntable 121 and has been locked against unwanted movement, the turntable 121 which is suspended in a slewing ring 122, can be turned by a turning motor 123 into a desired direction. The turntable 121 can be locked in given positions, enabling the unit 1 to move with a specific side of the unit facing in any specified direction into the rail system 120 or 10, since, as indicated by the double arrow in FIG. 7, the turntable operates through 360° in either direction.

The rail systems 10 and 120 are cut at planes 124 and 125 concentric with the turntable axis and with a diameter such that the turntable 121 with handling unit 1 can rotate freely.

FIG. 8 illustrates a lift 131 for a unit 1 which may be used to transfer the unit to a rail system at a different level. The lift 131 has a portion carrying the unit 1 and having the same rail profile as the rail system 10 for enabling the unit 1 to pass on or stay in the lift for raising or lowering the unit. There are at least two corner pillars 132 provided with wheels 133 to prevent any inclination of the lift 131. Raising and lowering the lift 131 is performed with the aid of screws 134 in the pillars 132. Each screw is driven by a motor 135, adapted electronically, electrically or mechanically for synchronous operation of the screws. When the unit 1 has entered the lift 131 and has been locked against unwanted movement, the lift is raised or lowered to the desired level. When the lift has been located at its new position, the unit 1 can continue out into the next rail system 130. The rail system 10 has been cut at plane 136 and the rail system 130 at plane 137, to provide space for the rail parts 138 of the lift.

FIG. 9 illustrates a fully atomated, closed material flow system between two production lines, here exemplified by an insulation line 201 and a cabling line 202. The insulation line 201 comprises a coiling station 203, a turntable 204 (according to FIG. 7) to the right of the station 203 for taking up empty handling unit 205, and a turntable 206 to the left of station 203 for discharging loaded units 207 to a buffer store 220, and a control operating unit 208 integrated with the line 201. The cabling line 202 comprises four uncoiling stations 209–212 and a control and operating unit 213 integrated with the line 202. The buffer store 220 comprises transport rails 214, power supply and signal rails 215 for the units, a transfer carriage 216 (according to FIG. 6) for transferring units from one line of units to the other, and two bypass devices 217 and a predetermined number of units 205, 207. The system is operated as follows. The insulation line 201 continuously produces cord-like material, a predetermined length of which is coiled on the reel of unit 207*a*, which is coupled to the coiling device at station 203. When the right length has been reached, the material on the reel is cut and finish-coiled. The loaded unit 207*a* is then conveyed to the left turntable 206 after disengaging the driving device 250 and lifting it from the handling unit conveying path so that an empty unit 205*a* can enter the working position from an idle position in the right turntable 204, the unit 205*a* then being coupled to the driving device 250 according to FIG. 4 at the coiling station 203 for being loaded with the next length of material. The empty right hand turntable 204 is turned 90° counterclockwise and an empty unit 205*b* from the buffer store 220 is fed into it. The turntable then returns to its starting position in register with the coiling station 203. The left hand turntable 206 containing a loaded unit is now turned 90° counterclockwise, and the loaded unit fed into the buffer store to a preprogrammed position 207*b*. In the buffer store 220 the carriage 216 and the bypass structure 217 are used for conveying and repositioning units according to a given production program. In the cabling line 202, discontinuously producing goods of already determined length, the material is uncoiled from four units 207*c–f* at unwinding stations 209–212. When material has been uncoiled from the units 207*c–f* the braking device 240, as shown in FIG. 3, at the uncoiling stations 209–212 are released and these devices are swung away from the handling unit conveying path, allowing the empty units 207*c–f* to be transferred to the buffer store 220 to programmed positions. Loaded units 207*a, b, g, h* are transferred to the uncoiling stations 209–212 according to a given program, for example by using the carriage 216 in readiness for the next uncoiling operation. The handling units require no manual operations, the whole operation sequence being controlled by a production program established for the two lines. Manual actuation of the system is, however, possible from two control units 208 and 213, or from a supervisory system.

FIG. 10 illustrates a fully automated materials flow system for a complete factory, here exemplified by a factory for producing power cable. The factory comprises production units as follows: one stranding line 261, two insulation lines 262, 263 for XLPE-cable (cross-linked polyethylene), one screening line 264, one jacketing line 265, one test room 266, a repair line 267, a recoiling line 268, a packing machine 269 for big reels and a packing machine 270 for small reels and two stations 271, 272 for respectively charging and discharging reels 273.

The stranding line 261 comprises a coiling station 274 and a control and operating unit 275 integrated with the line 261. The two insulating lines 262, 263 for XLPE each contains one uncoiling station 276, 277 and one coiling station 278, 279. There are three carriages 280, 281, 282 for transferring units at the uncoiling stations 276, 277, one carriage 281 being used in common. There are also three carriages 284, 285, 286 transferring units at the coiling stations 278, 279, one of them, the carriage 285 being used in common. There is a control and operating unit 287, 288 integrated with each of the lines 262, 263. The screening line 264 comprises an uncoiling station 289, a coiling station 290 and a control and operating unit 291 integrated with the line 264. The jacketing line 265 comprises an uncoiling station 292 with two carriages 293, 294, one on each side of unwinding station 292, for transferring units, a coiling station 295 with two carriages 296, 297, one on each side of the winding station 295, for transferring units, a bypassing structure 298 and a control and operating unit 299 integrated with the line 265. The test room 266 includes a turntable 340 feeding units to a collection rail 341 and to a test room rail 342, and an operating panel 343 controlling unit movements. The repair line 267 includes two forward-backward coiling stations 344, 345, two turntables 346, 347 and a control and operating unit 348 integrated with the line 267. The recoiling line 268 includes an uncoiling station 349, a coiling station 350 and a control and operating unit 351 integrated with the line 268. The packing machines 269, 270 include intermittent drives 352, 353 for reel rotation. A handling unit lift 355 is provided for vertical unit transfer between the right hand store 354 in the Figure and the coiling station 274 for the stranding line 261, the uncoiling and coiling stations 276, 277, 278, 279 for the insulating lines 262, 263 for XLPE and the uncoiling station 289 for the screening line 264. There is a unit lift 356 between the store 354 and the coiling station 290 for the screening line 264. There is a unit lift 357 between the store 354 and the uncoiling station 292 for the jacketing line 265. A unit lift 359 is provided between the left hand store 358 in the Figure and the coiling station 285 for the jacketing line 265, the test room 266, the uncoiling station 349 for the recoiling line 268, the packing machine 269 for big reels and the charging and discharging station 271 for reels. There is a unit lift 360 between the store 358 and the test room 266 and the repair line 267. There is a unit lift 361 between the store 358 and the winding station 350 for the rewinding line 268, the packing machihe 270 for small reels and the charging and discharging station 272.

The first store 354 to the right in FIG. 10 comprises four pairs of parallel rail systems 362, one transfer carriage 363, a turntable 364 and a given number of units. The second store 358, to the right in the Figure, comprises six parallel rail systems 365, a transfer carriage 366, four turntables 367, 368, 369, 370 and a given number of units. These two stores 354, 358 are interconnected by a rail system 371 for conveying units to intermediate lines 264, 265 and between the stores 354, 358. There is a turntable 372 adjacent the coiling station 292 for the jacketing line 265. Adjacent the coiling station 290 for the screening line 264 there is a turntable 373 and adjacent the lift 360 for the repair line 267 there is a turntable 374. All rail systems charge live rails for current and signals for the transport units. The operation of the system is as follows:

The stranding line 261 produces stranded wire and the wire strands are coiled in predetermined lengths in a unit at the coiling station 274. When the desired length has been reached the strand is cut and finish-coiled on the reel. The coiling device at station 274 is released from the unit and the loaded unit is conveyed via the carriage 280, lift 355 to the turntable 364 which turns it 180° in order to get the right uncoiling direction for the next operation. The unit is then transferred via the carriage 363 to the store 354 and to a predetermined programmed position. Meanwhile, in the store 354, 358 the carriages 363, 366 are being used for advancing and relocating units according to a production program, and an empty unit has been fetched from the store 354, transferred to the lift 355 and down to the rail 376 for setting up at the winding station 274 for the stranding line 261. The line 261 is then ready to recommence operation. The unit loaded with wire strands, on order from one of the two uncoiling stations 276, 277 for the continuously operating insulating lines 262, 263 for XLPE, is conveyed to the carriage 363 in the store 354, from these to the lift 355, down to the production plane and out to a selected carriage 280 or 282 and further to a wating position adjacent to the uncoiling station 276 or 277. When units are changed, the braking device at uncoiling station 276 or 277 will be moved out of the conveying path, enabling the empty unit to be conveyed to the common carriage 281 for further conveyance up to the store 354 to a predetermined position. Simultaneously, the loaded unit is taken from the waiting position into its working position and is coupled to the braking device at station 276 or 277 and is then ready for the next operation in the line 262 or 263. The insulated strands are coiled on to the reel of the unit at coiling station 278 or 279. When the right length has been reached the insulated strands are cut and the end is finish-coiled on the rail. Simultaneously, advance of the loaded unit out to the left carriage 285 or 286 is commenced, and the coiling device at station 278 or 279 is moved out of the conveying path, enabling the empty unit in the right carriage 284 or 285 to move into the working position and be coupled to the coiling device at station 278 or 279 for receiving the next length. The loaded unit in the left carriage 285 or 286 is moved to a predetermined, programmed position in the store 354, for taking down via carriage 363 and lift 355 to the next working position, which is the screening line 264 for discontinuous screening. The unit is coupled to the braking device at the uncoiling station 289 and is then ready for uncoiling. The screened cable is coiled up in the unit at the coiling station 290. When the right length has been reached the screened cable is cut and the end is finish-coiled on the reel. The coil device at station 290 is disengaged and moved out of the conveying path, enabling the loaded unit to be transferred via the lift 356 to storage, and to be replaced by an empty unit from the store 354, where a changeover will occur similarly as at the stranding line 261. The unit loaded with screened cable will be conveyed, by order from the continuously producing jacketing line 265, from the store 354 via the carriage 363, said two turntables 364, 372 and lift 357 to the uncoiling station 292, where units are exchanged similarly as at the uncoiling stations 276, 277 of the insulating lines 262, 263. The sheathed cable is coiled in the unit at the coiling station 295, where units are exchanged similarly as at the coiling stations 278, 279 of the insulating lines 262, 263. The loaded unit is then conveyed via the lift 359 and carriage 366 or via the turntables 367, 368, 369, 370 to a given position in the store 358. The unit loaded with sheathed cable is taken from the store 358 via the lift 359 and turntable 340 to the collecting rail 341 for preparing the ends before testing in the test room 266. After testing the unit is taken up to the store 358 via the lift 360 and turntables 367, 368, 369, 370. Units with rejected material are taken to the repair line 267, through the lift 360 to the turntables 346, 347 adjacent the coiling stations 344, 345 for fault tracing, repair and recoiling and for conveying back to the test room 266 for a new test and storage or repetition of procedure for rejects. The unit with approved cable is ordered from the store 358 and comes via a carriage 366 or the turntables 367, 368, 369, 370 and lift 359 down to the recoiling line 268 or for direct packing to the packing machine 269 for big reels. At the recoiling line 268 the unit is coupled to the braking device at the uncoiling station 349 for recoiling a delivery length in a unit at the coiling station 350, where units have been fetched from the store 358 via the lift 361 and possibly via the carriage 366. After the coiling operation the unit is conveyed for packing to the packing machine for small units. After packing the unit is conveyed to the unit charging and discharging stations 271, 272 where packed units are discharged and new units are picked up for conveying to the store 358 via the lifts 359, 361.

The handling units require no manual operations except for handling the free reels 273 at the charging and discharging stations 271, 272. The system is fully controlled by an established production program in a programmable central data unit, to be described later. Alternatively, the system can be manually operated from individual operating units 275, 287, 288, 291, 299, 343, 348, 351 at the corresponding production section.

Figure 11:
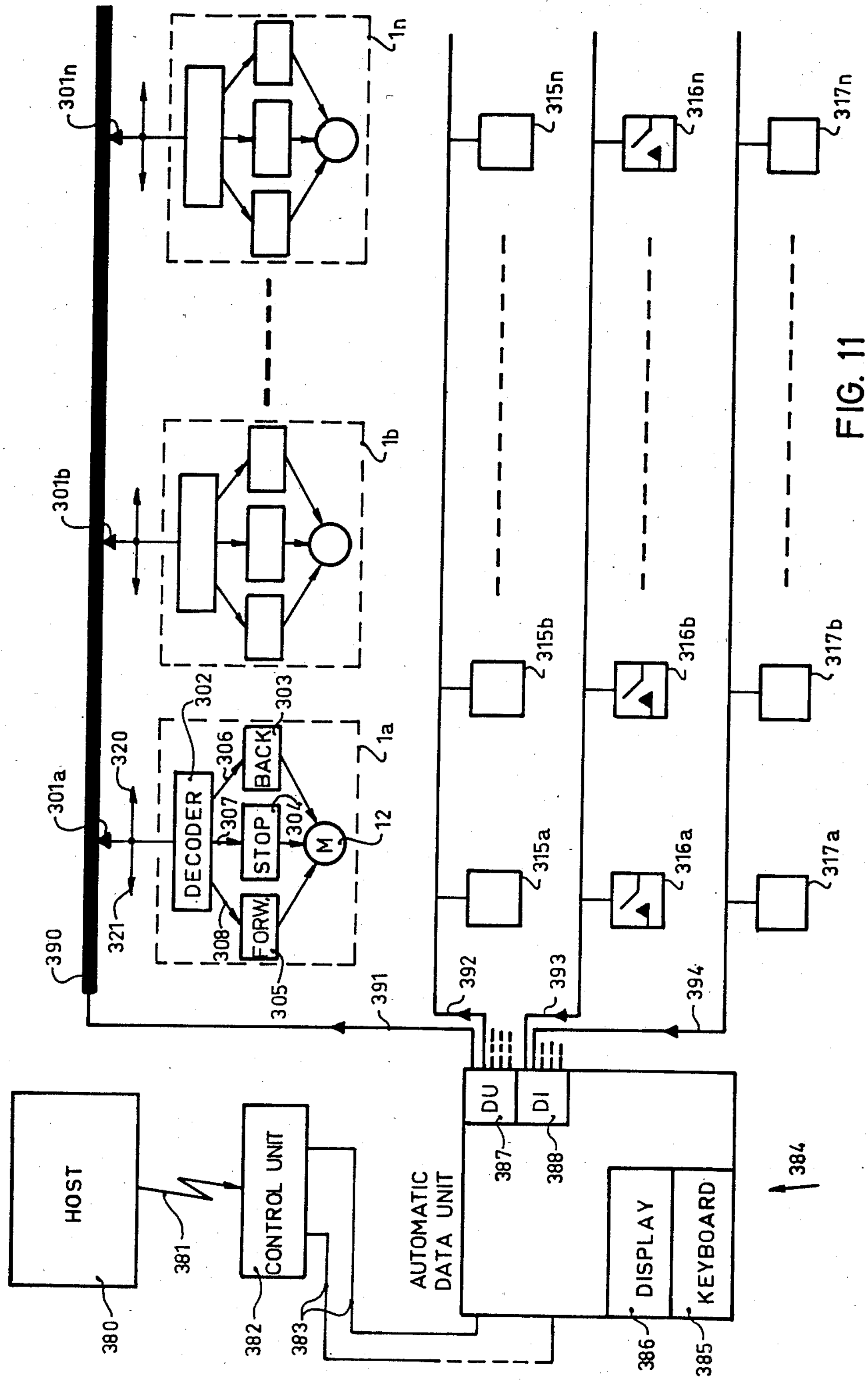
FIG. 11 is a block diagram of a control system for a plant according to FIG. 9 or FIG. 10.

According to FIG. 11 the operation of a number of handling units 1*a*–1*n* is controlled by an automatic data unit 384 which can be connected via a line 383 to a control unit 382 which in turn is connected via a line 381 to a host 380. This controlling computer system is preferably of the type described in the publication "IBM 3644 Automatic Data Unit, Component Description, GA 24-3653-2". However, any other similar data system for controlling industrial processes can of course be used.

The automatic data unit 384 starts a motor 12 in a unit 1*a* by sending from its "digital out" unit 387 on the line 391 an initiating control word comprising the address of unit 1*a* and a FORWARD command to a control bar 390. Each unit in the system is connected to the control bar 390 by sliding contacts 301*a–n*, one for each unit. When the control word reaches a decoder 302 in the unit 1*a* via sliding contact 301*a* the control word will be decoded and a FORWARD relay 305 will be activated via the output 308 of the decoder 302. The FORWARD relay 305 connects the motor 12 to the current collector 14 and the power rail 13, FIG. 1, for driving the unit 1*a* forward. The unit 1 will be stopped by a stop word on the line 391, the decoder 302 activating its output 307 and hence the stop relay 304. Similarly a movement in a reverse direction is initiated for the unit 1*a* by a backward command activating the output 306 and hence the backward relay 303. It should be noted that the decoders 302 in the other units 1*b*–1*n* are not energized, since the control words in the present case only include addresses for the unit 1*a*.

Figure 1:
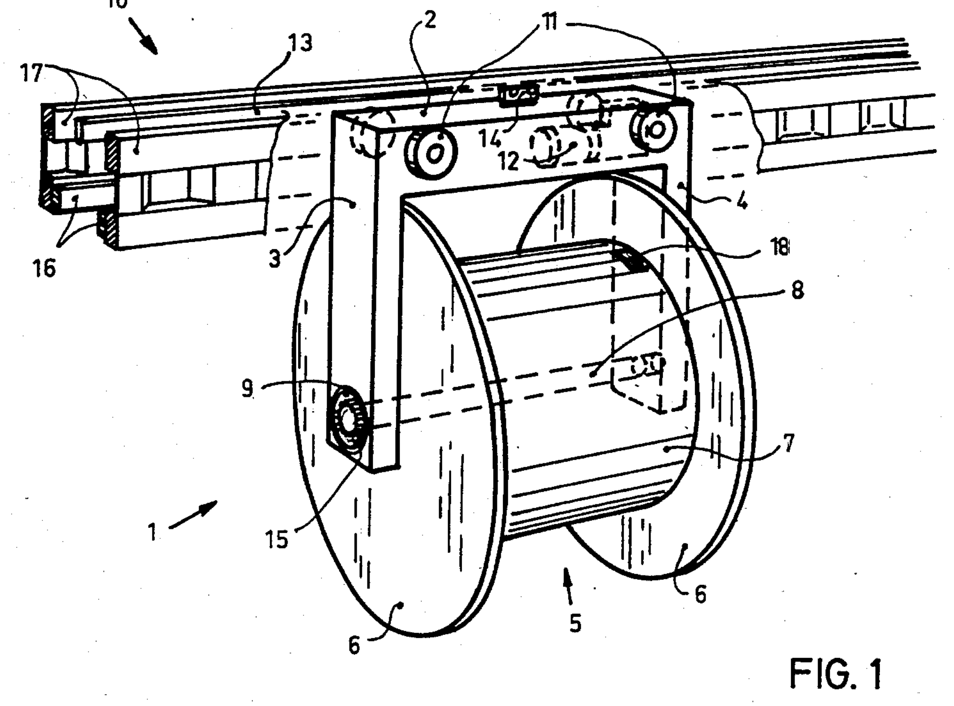
Figure 2:
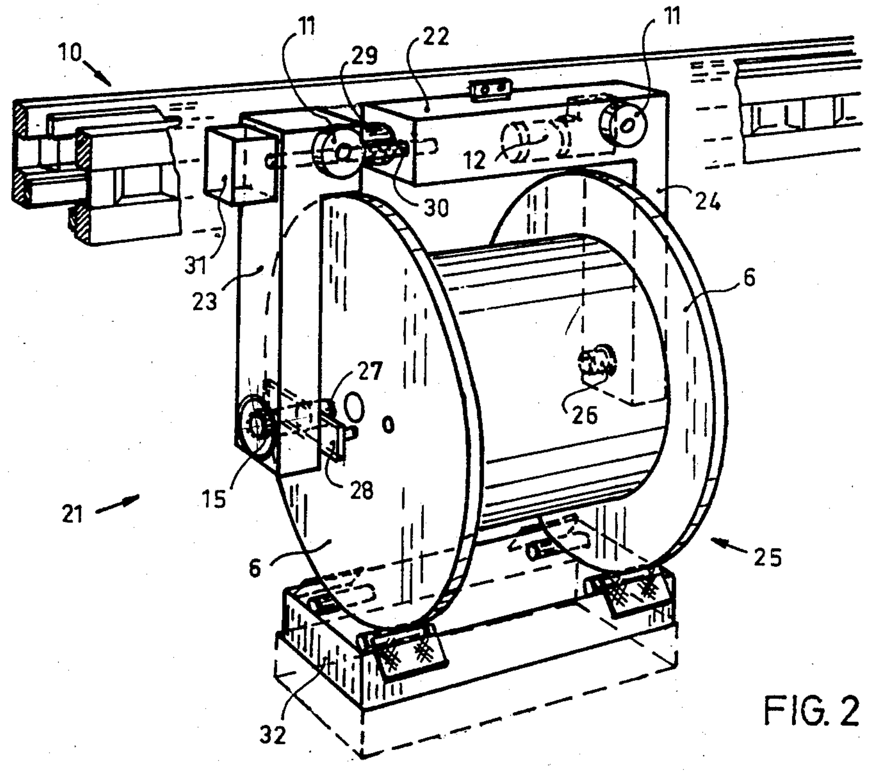
Figure 3:
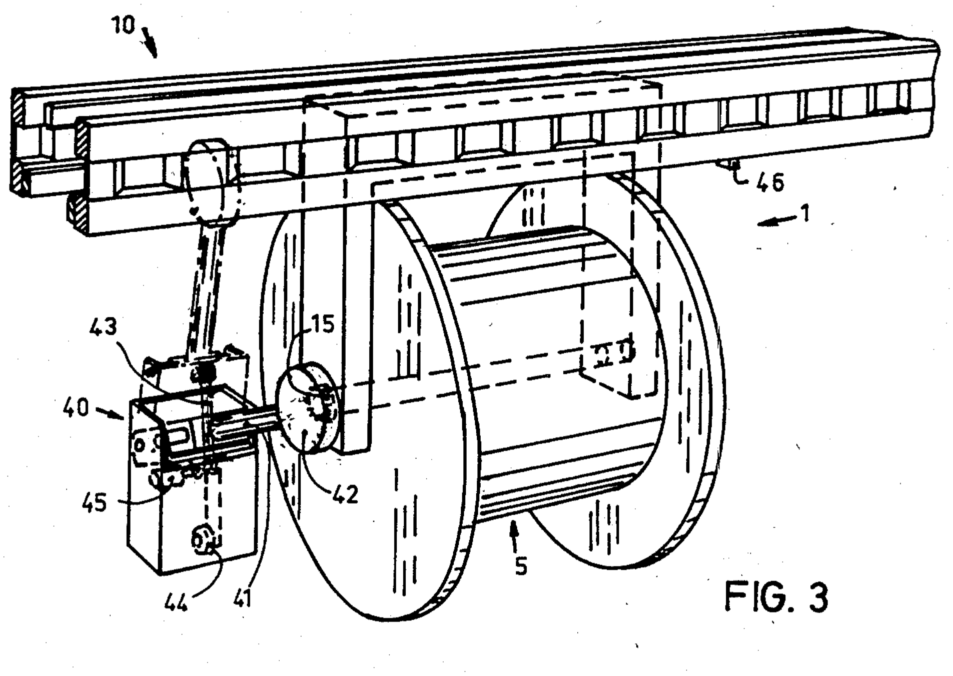

The control system monitors the movement of the units 1 in the rail system, see FIG. 1, by means of a number of sensors, preferably photocells. One such photocell 46 is shown in FIG. 3 and one photocell 59 in FIG. 4. These sensors are shown schematically in FIG. 11 with reference numerals 316*a*–316*n*. When a unit 1, for example the unit 1*n*, approaches a work station, a sensor, such as 316*b* will sense this movement and close its contact, whereby a signal will be sensed in the "digital in" unit 388 on channel 393. The data unit 384 then addresses the unit 1*n* with a stop command to stop the unit in a correct position at the station.

Figure 4:
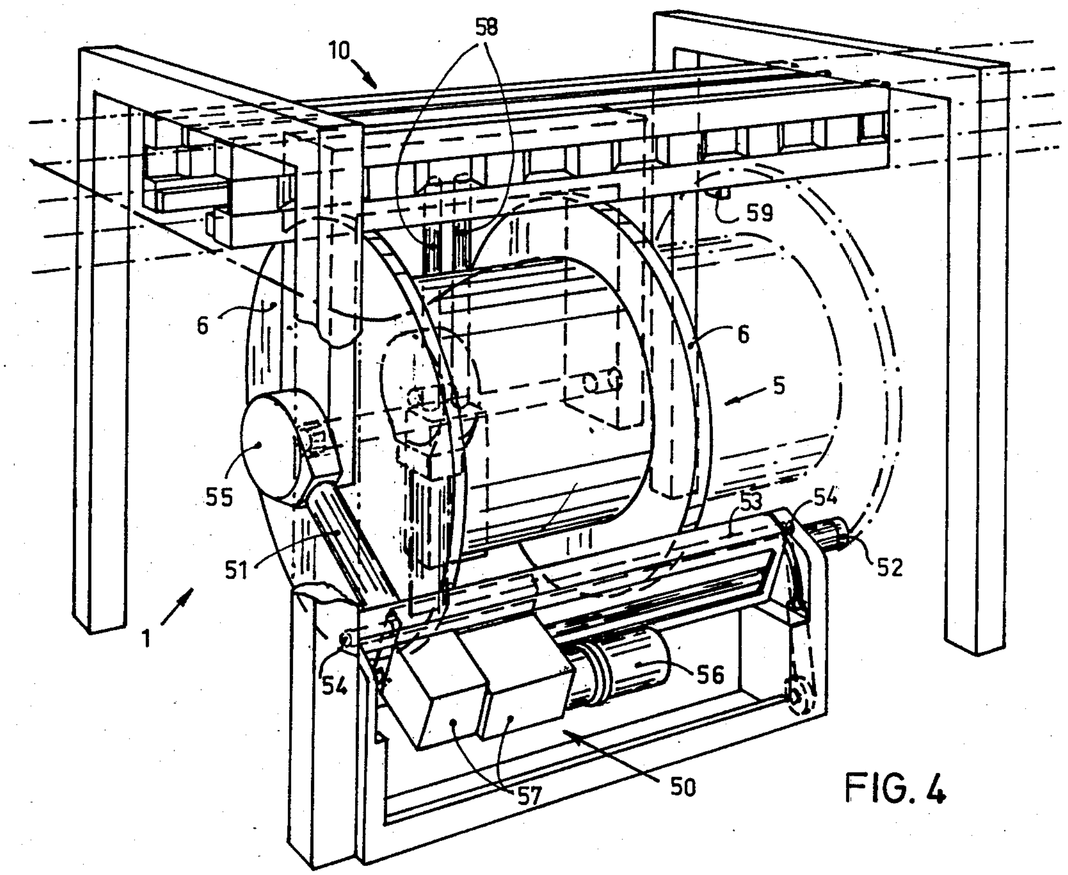
Figure 5:
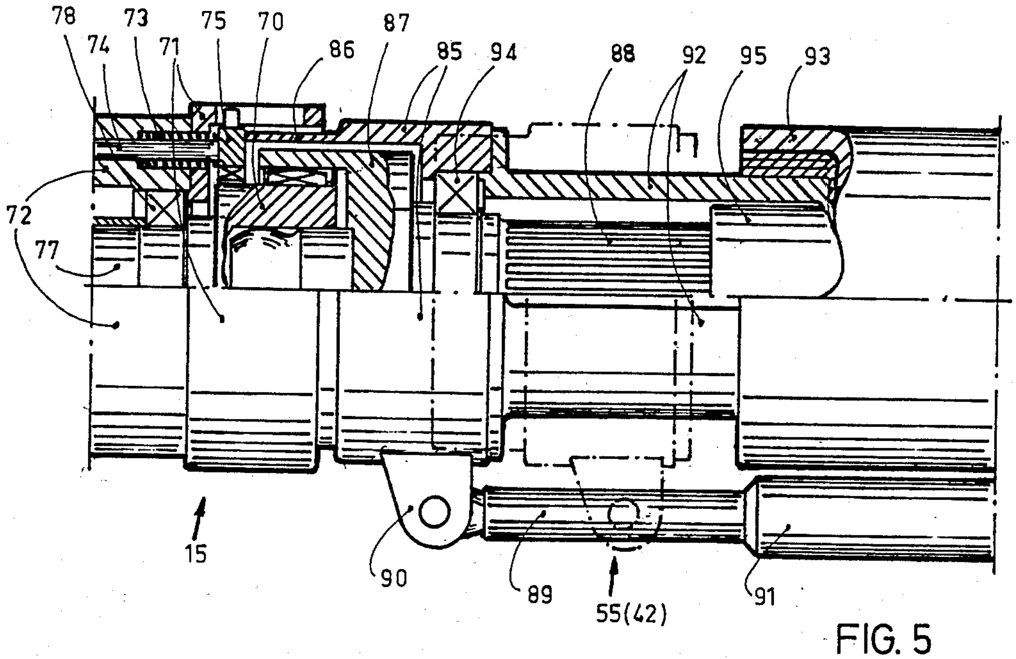

The control motors 44 and 45 in FIG. 3 and the control motors 52 and 56 in FIG. 4 are controlled by circuits 315*a*–315*n* which are connected to the data unit 384 by one or more digital-out lines 392. These circuits are permanently located in coiling or uncoiling stations and need not be addressed by words requiring a decoder.

Figure 9:
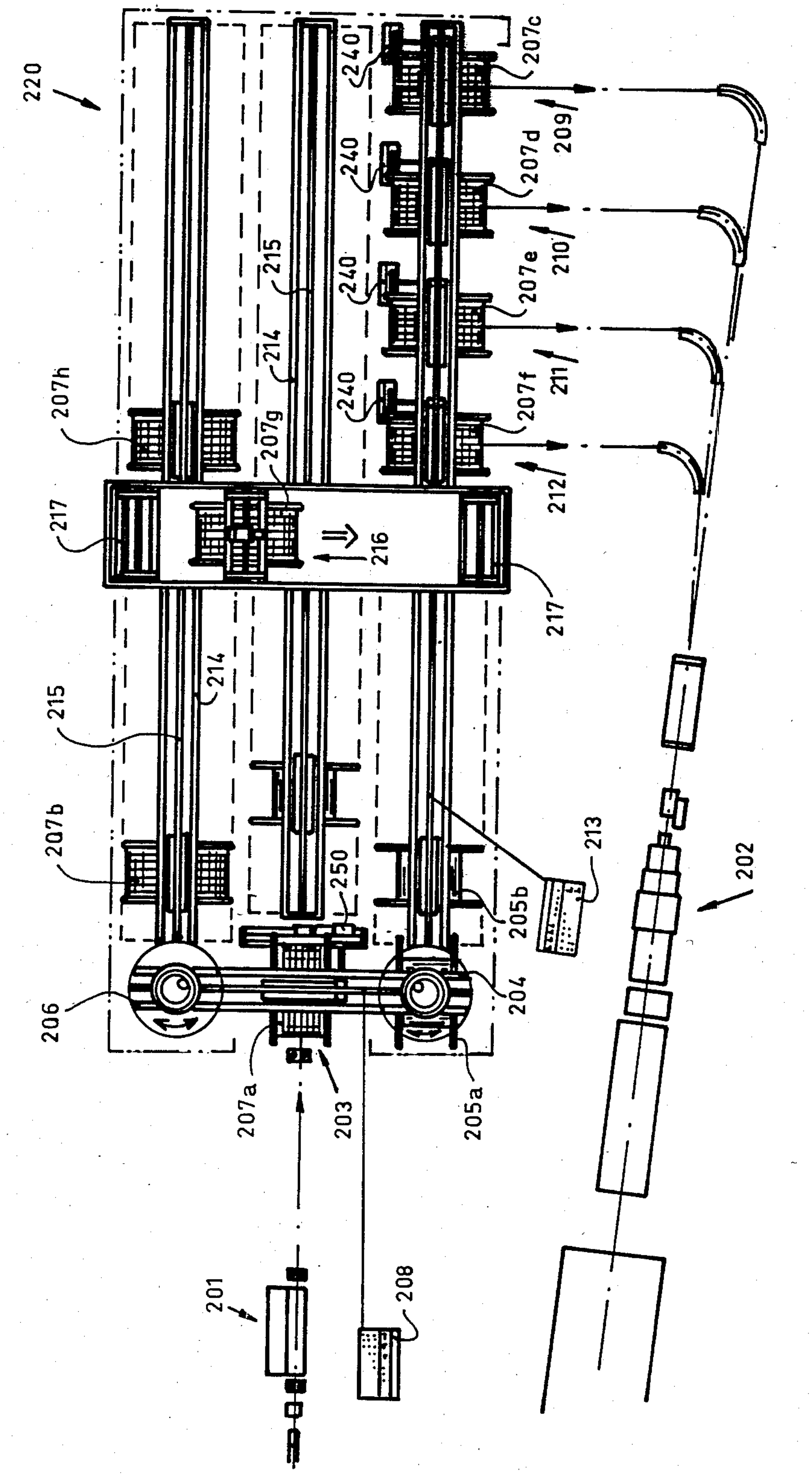

The control system also includes a plurality of manually or automatically controlled operating circuits 317*a*–317*n* distributed as required in the plant, preferably on the operating panels 208, 213 according to FIG. 9, in order to transmit plant operating signals over the digital-in channel 394 to the data unit 384.

The automatic data unit 384 comprises a display 386 and a keyboard 385 to provide operator supervision of the system.

The data collected in the unit 384 is transferred to the host 380 for analysis, for possible correction of the control program and for general production control.

Figure 12:
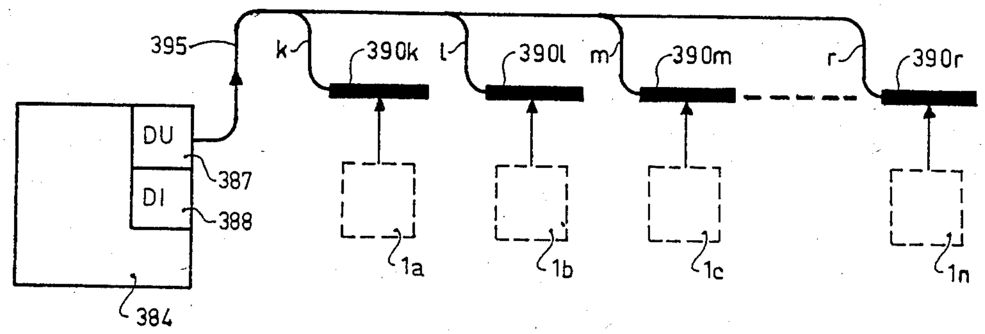
Figure 6:
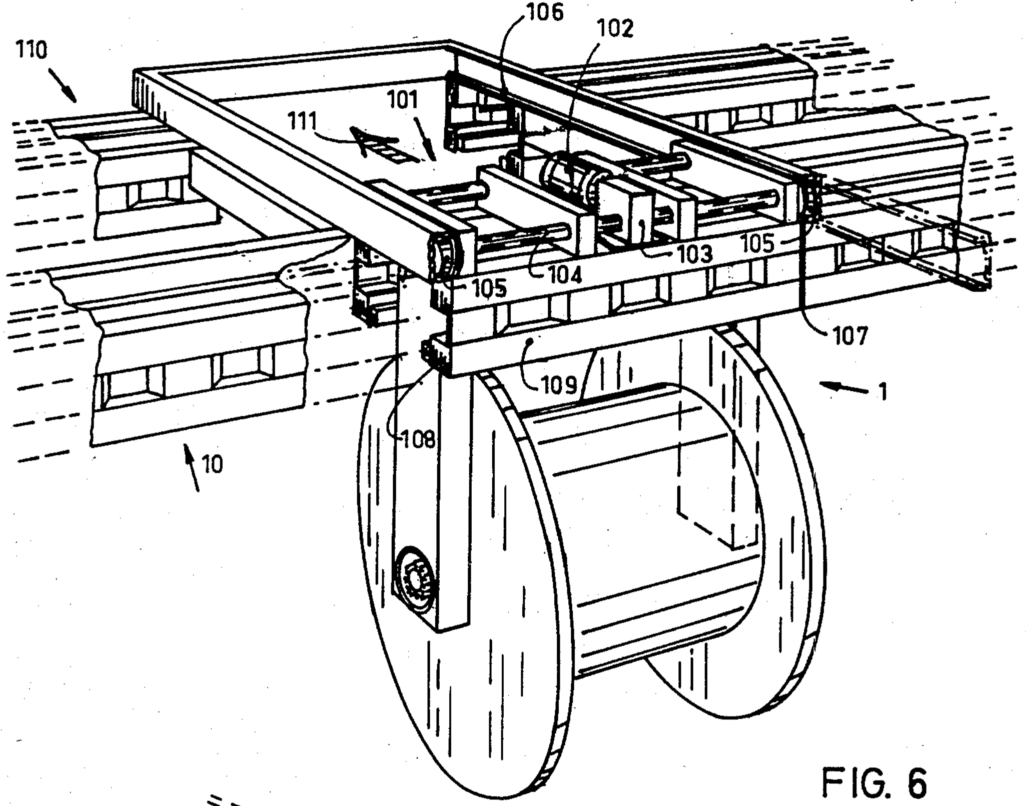
Figure 7:
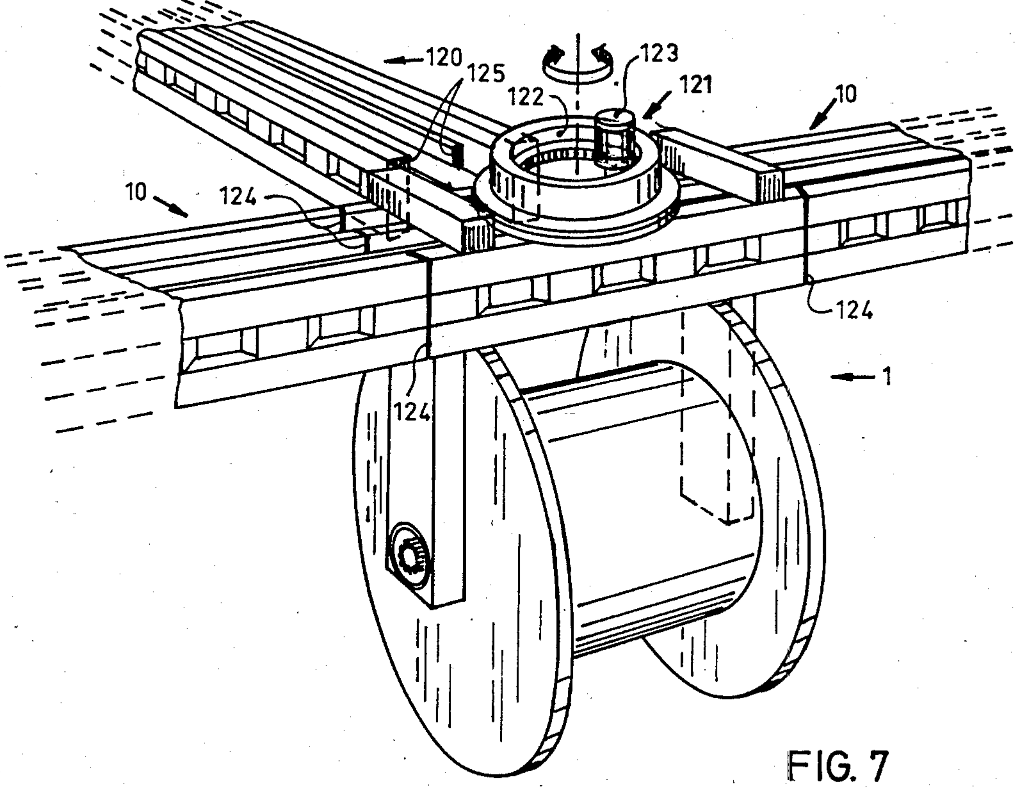
Figure 8:
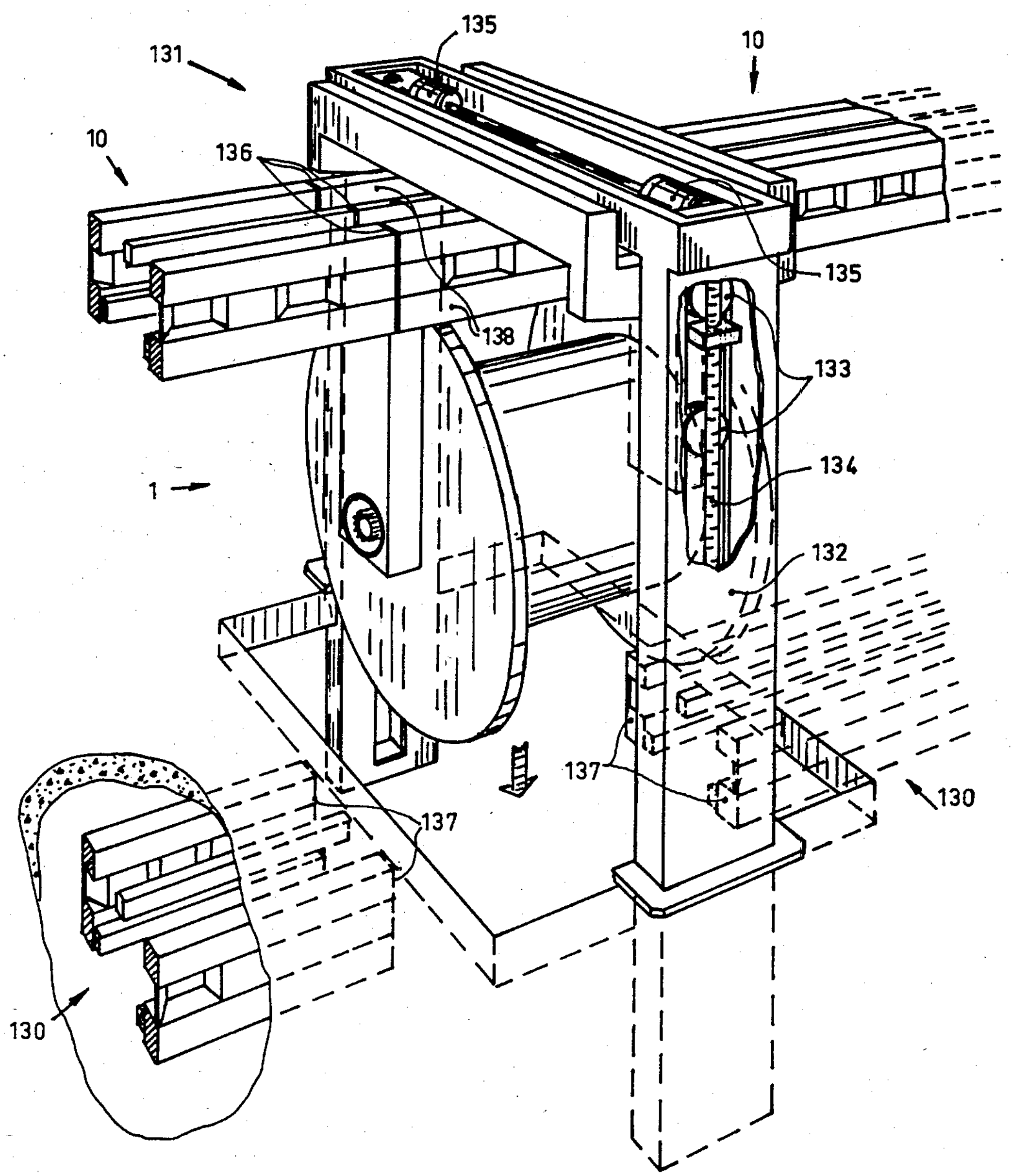

FIG. 12 illustrates a modified embodiment of the control system according to FIG. 11. The control bar 390 has been divided into a plurality of sub-bars 390*k*–390*r*, at least one for each work station, each bar being connected to the digital-out unit 387 via one or more lines 395. A handling unit 1*a*, in contact with the sub-bar 390*k*, and which is started by a start command via the line k from the line 395, moves towards the sub-bar 390*l* and can be stopped at this bar by a stop order on the line 395*l*. Each work station and each storage position in the buffer store can then be provided with its own sub-bar 390*k–r*, eliminating the need of individual address, decoding in each handling unit.

The function of the control system in accordance with FIG. 11*a*, FIG. 12 will now be described for the plant illustrated in FIG. 9.

It is assumed that an empty handling unit 207 is located at a coiling station 203 ready for coiling. A push button operation on the control panel 208 or some automatic start operation activates the control circuit 317*a* which signals this status to the digital-in unit 388. The digital-out unit 387 activates a control circuit 315*a* for a drive means 250 for connecting the means 250 to the unit 207*a*, whereby its reel starts coiling up cable from production line 201. During the coiling operation the motor 12 of the unit 207 is driven alternatingly forwards and backwards, as shown by the arrow 321 or 320 by signals from the digital-out (DU) unit 387 via the bar 390, thus causing the unit to traverse.

When the cable has been coiled up on the barrel, which operation can be sensed by a sensor 316, time-programmed or the like, the driving operation is stopped by a stop command to the circuit 315*a* and the driving means 250 is disengaged. The motor 12 of the unit 207*a* is started for movement towards the turntable 206, e.g. forwards, by a signal from DU 387. When the unit reaches the turntable 206, this will be sensed by a sensor, e.g. 316*a*, which is preferably a photocell 46 in the rail system 10. The digital-in (DI) unit 388 senses this state and the DU 387 stops the motor 12 with a stop command and sends a signal to the operation circuit, i.e. 315*b*, of the turntable starting its drivemotor 123. When the turntable has turned 90°, its motor is stopped with a STOP command to the circuit 315*b*, the motor 12 being started in reverse and stopped when the unit has reached a programmed position in the buffer store 220, e.g. the position 207*b* in FIG. 9.

At the same time as the unit 207*a* starts moving towards the turntable 206, the motor 12 of the empty unit 205*a* will be started in order to move the unit 205*a* to the coiling station 203, whereafter the operation is repeated.

The conveyance of the other units to and from the uncoiling stations 209–212 and their engagement with the disengagement from the braking devices 240 is principly controlled in the same way by conveying signals from DU 387 to the units, operating signals from DU 387 to control circuits 315 to operate the braking devices 240 and by sensing signals from the sensors 316 and operating signals from the circuits 317 to DI 388.

The carriage 216 and the bypassing units 217 are also controlled by control signals via the rail system 390 and by signals from the sensors 316.

Figure 10:
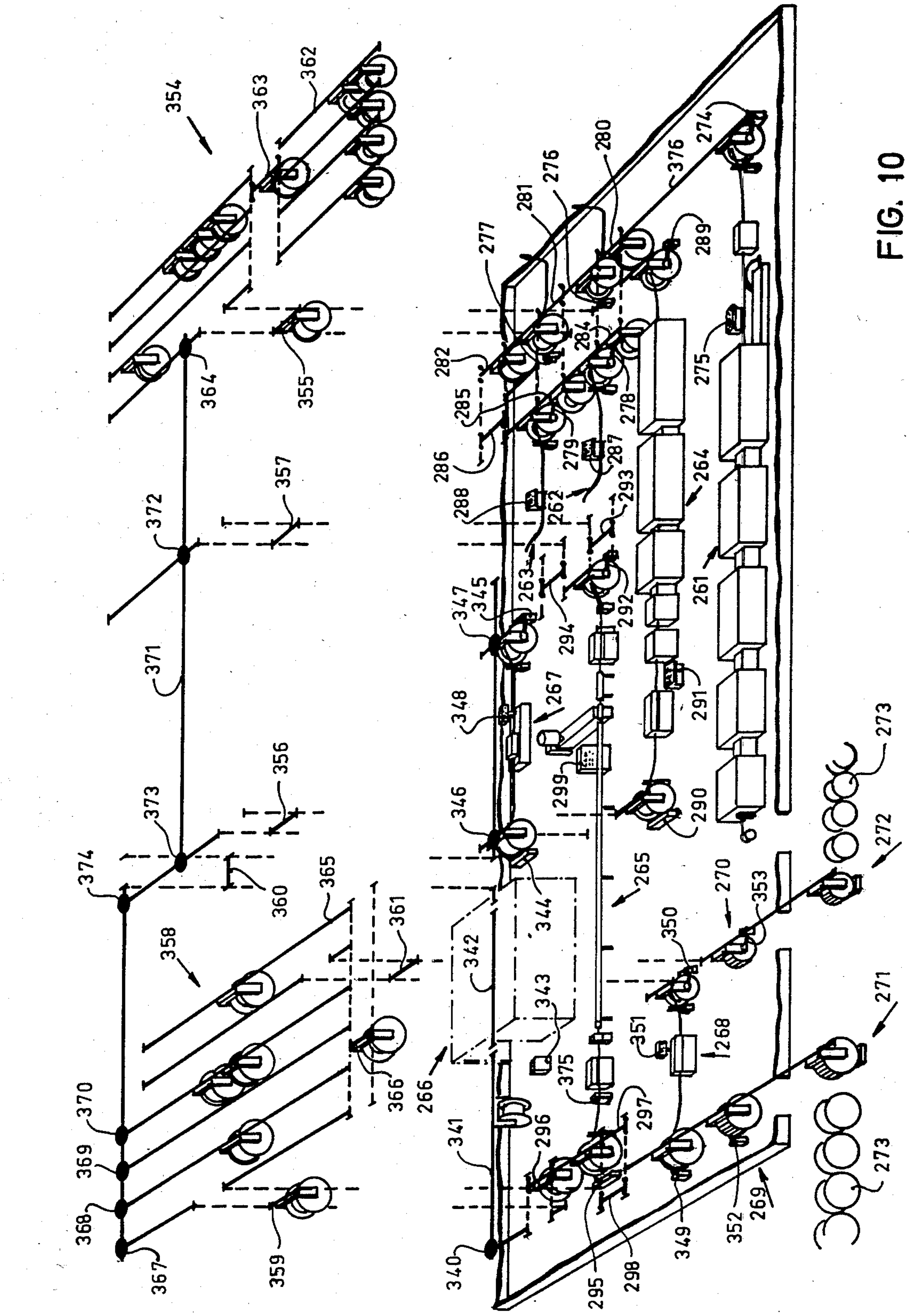
FIG. 10 illustrates a system where units are stored and conveyed on a level above the production level. It is, however, possible to do the storing and associated conveying at a level below the production level, using culverts for conveying purposes, for example.

It should be observed that when a coiling station cooperates in a production line with an uncoiling station in the other end of the line, as shown in FIG. 10, the automatic data unit 384 should synchronize via DU 387, DI 388 and associated lines the operation of both said stations in order to achieve shock-free and smooth operation of the production line.

The present invention has been described according to a preferred embodiment but it is, however, obvious for one skilled in the art that a number of constructional changes can be made in the system without departing from the inventive concept.

Hence, the conveyor rail system can be arranged under the handling unit instead of above it. Furthermore, the rail system can be replaced by any other similar guiding and controlling path along which the handling units are moved.

The barrel 5 of the transport unit shown in FIGS. 3 and 4 can of course also be driven via the end walls 6. Further, the coupling element 15 at the end of the shaft 8 could include a gear with which the coupling part 55 on the arm 51 or the braking element 42 on the arm 41 may be engaged.

In order to increase the degree of automation in the system still further an end of a cable can automatically be inserted into an attachment means 18 on an empty barrel, according to FIG. 1. This requires suitable cable guides 375 at a coiling station, e.g. station 295 in FIG. 10.

FIG. 13 shows a device for handling units 1 in a system according to another embodiment of the invention. The handler 401 comprises a cart 402 or a sledge guided in a rail system 10 by guiding rolls 403. A step motor 404 is mounted on the cart 402 for driving the cart 402 and a handling unit 1. The driving power is transferred to the rail system 1 by a drain 405 fastened to a rail 17. Two chain wheels 406 and 407 are running along the rail 17 driven by the step motor 404. The first wheel 406 is coupled directly to the step motor 404 and the second wheel 407 is driven by the first wheel 406 via a chain 408. The use of two wheels 406, 407 for driving against the chain 405 enables a synchronous passage over rail joints etc where otherwise a risk of slipping would occur and would disturb an exact positioning in the system. The stop motor comprises a digital pulse generator 409 for locating the handler 401 to a right position. The cart comprises a gripper 410 for transport of a unit 1. When released the handler 401 can bypass one or several units 1. There is a power and control rail 13 along the rail system 10 for supplying driving power to the step motor 404 and for providing forward, backward and stop orders and order for gripping or releasing a unit 1. A follower 14 is provided on the handler 401. Digital control signals received from a computer or data unit 383 (FIGS. 11 and 12) are processed in an electronic unit 411 in the handler 401.

The handler 401 in FIG. 13 operates as follows. By means of a control system, previously described with reference to FIGS. 11 and 12, the step motor 404 is started via the power rail 13 and the follower 14 causing the handler 401 to move along the rail system 10. When the handler 401 reaches a desired unit 1 the handler will stop and the gripper 410 grips the unit 1 which will be fixed by a control signal from the electronic unit 411. The handler 401 starts moving and transfers the unit 1 to a desired position. The handler will now stop and the gripper 410 releases the unit 1 when so ordered by the data unit 383. The handler 401 is now free for the next operation.

One advantage provided by the handler 401 is that a motor 12 included in each unit 1 of FIG. 1 can be replaced by one or several handlers 401, depending on the intensity of transportations and the distances moved. This will reduce the cost for each unit 1 and the data unit 383.

It should be noted that the handler 401 in FIG. 13 has been shown with a chain 405 transferring driving power, but other similar means can be used, such as a toothed rack, a wire or a friction device. The handler can also be running on one rail or on a separate rail instead of on the two rails 17. Further, the handler can have an accumulator as power source and a wireless transmission system for commands and orders.

All such changes can be made without departing from the inventive concept of the present invention.

What is claimed is:

1. A handling system for cord-like goods comprising:
- a plurality of work stations at least one of which including a rotary drive mechanism, said rotary drive mechanism comprising a movable arm and a power-driven actuator for moving said arm,
- means defining a guide path leading to said work stations,
- a handling unit movable along said guide path between said work stations and comprising:
  - a self-propelled support structur having means mountable on the guide path for movement therealong,
  - propulsion means including a motor on said support structure for moving said support structure along the guide path,
  - a reel rotatably mounted on said support structure and upon which the cord-like goods can be coiled and uncoiled,
  - a drive coupling member connected to said reel and connectible to the rotary drive mechanism at said one work station for rotating the reel, and
- a common control unit operably connected to both said propulsion means and said power driven actuator for actuating same.

2. A handling unit according to claim 1, wherein said drive coupling member comprises a shaft extending through said reel and having teeth on at least one end for engagement with a drive mechanism.

3. A handling unit according to claim 1, wherein said motor of said propulsion means comprises means driven by said motor and arranged to engage said guide path to move said support structure relative thereto.

4. A handling unit according to claim 1, wherein said support structure is U-shaped, having two legs interconnected by a beam, said beam carrying wheels arranged to mount said support structure on the guide path, said reel being rotatably supported between said legs, said reel including a pair of end walls and a drum therebetween.

5. A handling unit according to claim 4 wherein said legs are movable away from one another to enable said reel to be inserted and removed from said support.

6. A handling unit according to claim 1, wherein said coupling member includes releasable latching means for coupling said reel to said support structure to prevent rotation of said reel.

7. A handling apparatus for cord-like goods comprising:
- a guide path extending between a plurality of work stations, at least one of said work stations including a rotary driving means having a first coupling member,
- a self-propelled support structure mounted for movement along said guide path,
- a reel rotatably mounted on said support structure and upon which the cord-like goods can be coiled and uncoiled,
- a second coupling member connected to said reel, and connectible to said coupling member,
- propulsion means including a motor for moving said support structure along said guide path to locate said reel selectively at a work station where said first and second coupling members are interconnected to rotate said reel, and
- a control unit operably connected to said propulsion means and said rotary drive means for actuating same,
- said rotary driving means comprises an arm on which said first coupling means is mounted, said arm being movable relative to said guide path, means for moving said arm to align said first coupling member with said second coupling member for interengagement, and motor means for rotating said first coupling member, said control unit being connected to said means for moving said arm and to said motor means for actuating same.

8. A handling apparatus according to claim 7, wherein said arm is mounted for pivotal movement about an axis disposed parallel to said guide path, said motor means being located adjacent the mounted end of said arm, driving power being transferred to said first coupling member through said arm.

9. A handling apparatus according to claim 7, wherein one of said work stations comprises an uncoiling station, a reel braking mechanism disposed at said uncoiling station and including an arm pivoted at one end, a brake member at the other end which is connectible to said second coupling member, and motor means for pivoting said arm and moving said brake member into and from engagement relative to said second coupling member.

10. A handling apparatus according to claim 7, wherein said second coupling member includes a latch releasably interconnecting said reel and support structure to prevent rotation of said reel, said first coupling member comprising means for automatically releasing said latch in response to interengagement between said first and second coupling members.

11. An integral handling system for cord-like goods comprising a plurality of work stations including at least one coiling station and one uncoiling station, a guide path interconnecting said work stations, a plurality of handling units movably mounted on said guide path and each including a rotatable reel, means including a motor for propelling said handling units along said guide path between said work stations which include means for coiling and uncoiling cord-like goods onto and from the reel, said guide path comprising a pair of non-aligned sections and motor-driven transfer means for transferring the handling units therebetween, and a control unit operably connected to said propelling means, said coiling and uncoiling means, and said transfer means for actuating same, said guide path including non-aligned track sections which intersect at an angle, said transfer means comprising a rotary turntable disposed at the point of intersection of said track sections and being movable from a first position alignable with one track section to a second position alignable with another track section.

12. A handling system according to claim 11, wherein said guide path includes a buffer store for storing a plurality of handling units.

13. A handling system according to claim 11, wherein said cord-like goods comprise cables, said work stations comprising portions of production lines for producing said cables.

14. An integrated handling system for cord-like goods comprising a plurality of stations including at least one work station, a guide path interconnecting said stations, a plurality of handling units movably mounted on said guide path and each including means for carrying a rotatable reel upon which cord-like goods can be coiled and uncoiled in said one work station, rotary means at said one work station for rotating said reel, means including a propelling motor for propelling said handling units along said guide path, said guide path comprising at least a first and a second track section, and a transfer unit for transferring handling units between said first and second track sections, said transfer unit comprising propulsion means for moving the transfer unit from a first position, where a handling unit enters the transfer unit from said first track section, to a second position located at a distance from said first position where said entered handling unit leaves the transfer unit onto said second track section, and a control unit operably connected to said propelling motor, said propulsion means, and said rotary means, for actuating same.

15. A handling system according to claim 14, wherein said first and second track sections are parallel, said transfer unit traveling perpendicularly between said sections.

16. A handling system according to claim 15, wherein said track sections lie in a common vertical plane.

17. A handling system according to claim 15, wherein said track sections lie on a common horizontal plane.

18. A handling system according to claim 17, wherein said track sections each comprise parallel first rails, said transfer unit including parallel second rails which fit into gaps in said track sections and align with said first rails of the latter.

19. An integrated handling system according to claim 14, wherein said stations include at least one coiling station for coiling cord-like goods upon a reel in a handling unit and a storage station for unloading a coiled reel from a handling unit.

20. An integrated handling system according to claim 14, wherein said stations include at least one uncoiling station for uncoiling cord-like goods from a reel in a handling unit and a storage station for loading an uncoiled reel on a handling unit.

21. An integrated handling system according to claim 14, wherein said stations include at least one coiling station, one uncoiling station and one storage station.

* * * * *